(12) United States Patent
Parker

(10) Patent No.: US 6,795,859 B2
(45) Date of Patent: Sep. 21, 2004

(54) SCALABLE SERVER ARCHITECTURE SYSTEMS AND METHODS

(76) Inventor: Dennis Parker, 17715 N. Rim Dr., Leander, TX (US) 78641

(*) Notice: Subject to any disclaimer, the term of this patent is extended or adjusted under 35 U.S.C. 154(b) by 378 days.

(21) Appl. No.: 10/090,290

(22) Filed: Mar. 2, 2002

(65) Prior Publication Data

US 2002/0123332 A1 Sep. 5, 2002

Related U.S. Application Data

(60) Provisional application No. 60/272,907, filed on Mar. 2, 2001, provisional application No. 60/177,329, filed on Jan. 21, 2000, provisional application No. 60/180,649, filed on Feb. 7, 2000, provisional application No. 60/220,730, filed on Jul. 26, 2000, provisional application No. 60/241,096, filed on Oct. 17, 2000, provisional application No. 60/241,095, filed on Oct. 17, 2000, provisional application No. 60/241,087, filed on Oct. 17, 2000, and provisional application No. 60/240,985, filed on Oct. 17, 2000.

(51) Int. Cl.[7] .............................................. G06F 15/16
(52) U.S. Cl. ...................... 709/228; 709/227; 709/238; 709/202
(58) Field of Search ................................ 709/228, 227, 709/229, 225, 203, 202, 238; 713/200, 201, 202

(56) References Cited

U.S. PATENT DOCUMENTS

| | | | |
|---|---|---|---|
| 5,572,528 A | | 11/1996 | Shuen |
| 6,098,093 A | * | 8/2000 | Bayeh et al. ............... 709/203 |
| 6,144,651 A | | 11/2000 | Rinchiuso et al. |
| 6,166,729 A | * | 12/2000 | Acosta et al. ............... 345/719 |
| 6,598,077 B2 | * | 7/2003 | Primak et al. .............. 709/219 |
| 6,606,708 B1 | * | 8/2003 | Devine et al. .............. 713/201 |

* cited by examiner

*Primary Examiner*—Mehmet B. Geckil
(74) *Attorney, Agent, or Firm*—The Law Firm of H. Dale Langley, Jr., PC

(57) ABSTRACT

A wireless communications network includes a wireless client device, such as a notebook computer, a personal digital assistant, or a data-enabled telephone. The network includes a router for receiving communications from the wireless client device. The router is connected to an application service provider (ASP) server computer of the network. The ASP server computer of the network has a tiered architecture that includes a deserialized server and a centralization server. The deserialized server functions to handle relatively dynamic information in client-server communications with the wireless client device, and the centralization server functions to handle relatively static information in such communications. A session server of the ASP server computer generates a proxy cookie. The proxy cookie includes all relevant information for the wireless client device for the particular communications session. The client device wirelessly communicates with the router according to specialized protocols, the router, deserialized server, the centralization server, and the session server communicate according to standard protocols, and the proxy cookie is commonly shared to control routing for purposes of segregating the relatively dynamic information and relatively static information according to the ASP server computer tiered architecture.

2 Claims, 4 Drawing Sheets

SCALABLE SERVER ARCHITECTURE SYSTEMS AND METHODS

CROSS-REFERENCE TO RELATED APPLICATION

This application is related to U.S. Provisional Patent Application No. 60/272,907 entitled "Scalable Server Architecture Systems and Methods", filed Mar. 2, 2001, co-pending herewith and which is hereby incorporated herein by this reference.

The present application is related to U.S. patent application (CPA) Ser. No. 08/852,557, entitled "Remote Digital Image Viewing System and Method", filed May 7, 1997 (CPA filed Oct. 26, 1999) now U.S. Pat. No. 6,166,729; U.S. Provisional Patent Application No. 60/177,329, entitled "Wireless Network System and Method", filed Jan. 21, 2000; U.S. Provisional Patent Application No. 60/180,649, entitled "Digital Image Transfer System and Method", filed Feb. 7, 2000; and U.S. Provisional Patent Application No. 60/220,730, entitled "Wireless Network System and Method," filed Jul. 26, 2000, each of the same inventor hereof, and those respective applications are incorporated herein. The present application is also related to U.S. Provisional Patent Application No. 60/241,096, entitled "Wireless ASP Systems and Methods," filed Oct. 17, 2000, U.S. Provisional Patent Application No. 60/241,095, entitled "E-Mail and Messaging Systems and Methods," filed Oct. 17, 2000, U.S. Provisional Patent Application No. 60/241,087, entitled "Wireless Communications Protocols and Architectures Systems and Methods," filed Oct. 17, 2000, and U.S. Provision Patent No. 60/240,985, entitled "Browser and Network Optimization Systems and Methods," filed Oct. 17, 2000.

BACKGROUND OF THE INVENTION

The present invention generally relates to wireless communications systems and methods and, more particularly, relates to scalable server architecture systems and methods for wireless packetized data communications networks using specialized protocols.

Conventional packetized data communications protocols and network architectures were developed primarily for use in wired networks and conditions. The protocols and networks are not optimized for the peculiarities of wireless communications environments. Networks, particularly client-server networks such as the Internet, are commonly designed to conform to standardized protocols, for example, the Transport Control Protocol/Internet Protocol (TCP/IP).

In wireless communications, protocols more appropriate for the wireless environment and conditions can provide better performance. The related patent applications describe various protocols and other features that aid wireless communications, such as wireless Internet and e-mail communications. In particular, the related applications describe certain client-server networks for the wireless communications. A desirable aspect of these networks is that be scalable in order to permit and enable desired communications between wireless client devices and wireless application server provider (ASP) servers. Moreover, these ASP servers must be able to also function with standard communications protocols and characteristics for communications over and with standards-based networks and components, for example, over the Internet with other wired and wireless Internet devices that communicate using TCP/IP or other common protocols.

It would be a significant improvement in the art and technology to provide systems and methods for providing such scalable server architectures capable of communicating wirelessly via specialized wireless protocols, yet maintaining capabilities to integrate those wireless communications for use in communications over standard networks and protocols for communications, for example, over the Internet.

SUMMARY OF THE INVENTION

An embodiment of the invention is a wireless communications network. The network includes a client device, a router, a deserialized server, a centralization server; and a session server that generates a proxy cookie. The client device wirelessly communicates with the router according to specialized protocols, the router, deserialized server, the centralization server, and the session server communicate according to standard protocols, and the proxy cookie is commonly shared to control routing for purposes of segregating relatively dynamic information and relatively static information.

Another embodiment of the invention is a method of wireless client-server communications. A client device communicates wirelessly with a wireless application service provider (ASP) server computer via specialized protocols. The method includes communicating by the client device to a router of the ASP server computer, communicating by the router to a session server of the ASP server computer, generating a proxy cookie by the session server, delivering the proxy cookie to the router, and, directing access by the client to the ASP server computer by the proxy cookie.

BRIEF DESCRIPTION OF THE DRAWINGS

The present invention is illustrated by way of example and not limitation in the accompanying figures, in which like references indicate similar elements, and in which.

DETAILED DESCRIPTION OF PREFERRED EMBODIMENTS

Figure 1:
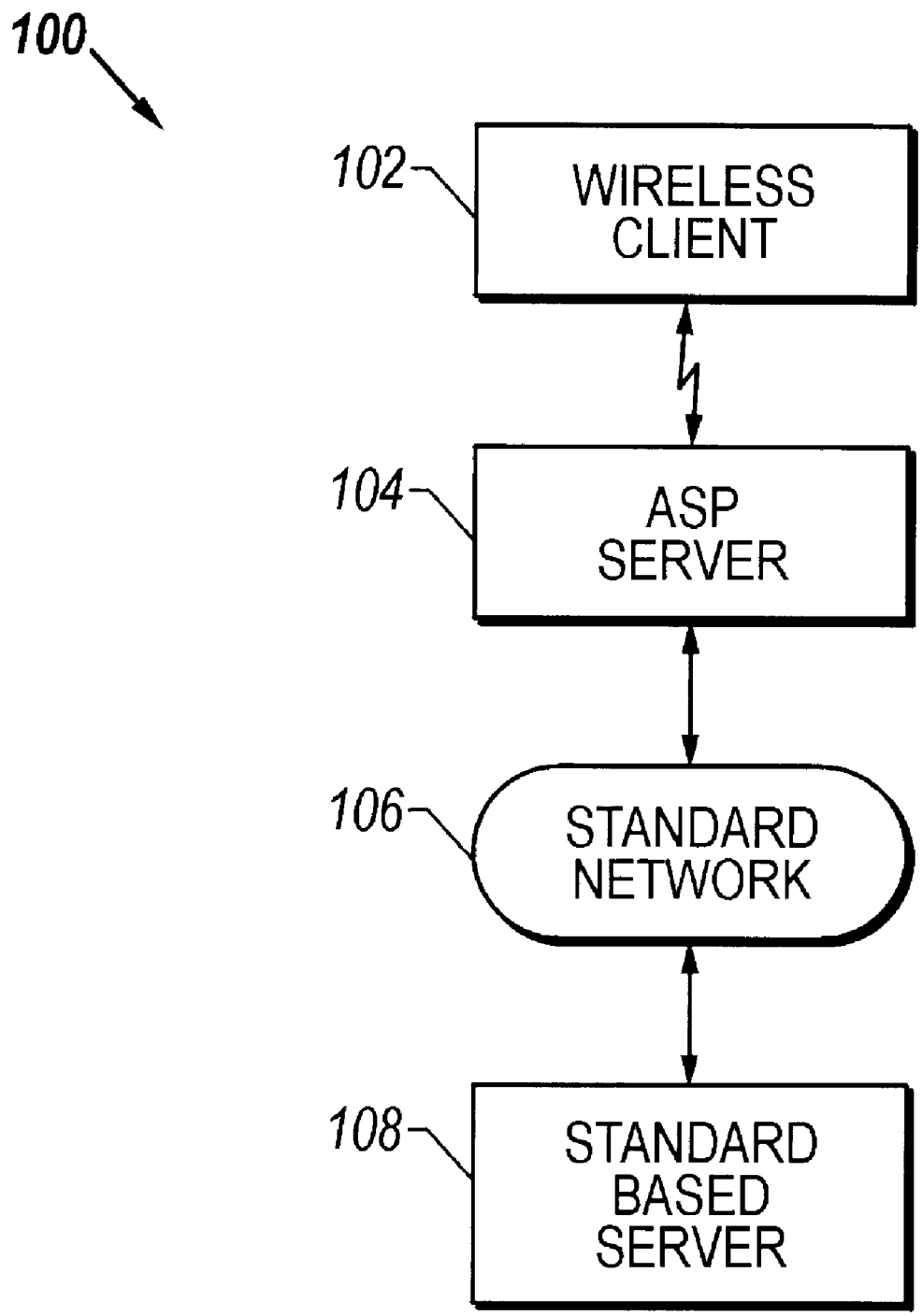
FIG. 1 illustrates a client-server network including a wireless client device and an ASP server for wirelessly communication with the wireless client device, according to embodiments of the present.

Referring to FIG. 1, a communications system 100 includes a wireless communications portion and a wired communications portion. The system 100 includes a network, such as the Internet 106. The network is operable according to a particular packetized data protocol, such as transport control protocol/Internet protocol (TCP/IP) or some other network protocol. The network, such as the Internet 106, interconnects various computing and communications devices, for example, among other devices, a server computer 108 and a wireless ASP server computer 104. The server computer 108 and the wireless ASP server computer 104 are each one or more server computers including a microprocessor, memory storage, and communications capabilities via wire or wireless connection with the Internet 106. The server computer 108 and the wireless ASP server computer 104 communicate over the Internet 106 or other network via the particular protocol of the network, such as the standard Internet network protocol TCP/IP.

The network, such as the Internet 106, is also connected with a wireless communications service provider (not shown in detail, although the wireless communications connection is illustrated by the arrow between the ASP server computer 104 and a wireless client device 102 in FIG. 1). The wireless communications service provider is, for example, a cellular or other packetized data wireless communications network. The wireless service provider connects by wire connection with the network, such as the Internet 106. Alternatively, the wireless communications service provider could connect with the network 106 by other communications connection, such as fiber optic, coax cable, wireless channel, or other communications connection. Furthermore, the wireless communications service provider can be a single particular communications channel, multiple links and multiple channels of those links, for example, communications links of wired and wireless channels, can alternatively provide the same functions and are included for purposes of the description.

The wireless service provider is capable of communicating through wireless channels with various devices, such as a wireless device 102. The wireless device 102 is a processing device, such as a data-enabled cellular telephone, a personal digital assistant, a laptop computer, or any of a wide variety of other processing devices that can wirelessly communicate with the wireless service provider. Of course, the wireless device 102 includes communications equipment for accomplishing the wireless communication with the wireless service provider, such as wireless modem.

The wireless device 102 communicates through the wireless service provider and over the network, such as the Internet 106, with the wireless ASP server computer 104. The wireless ASP server computer 104 serves as a dedicated server for the wireless device 102 in its communications. The wireless ASP server computer 104 sends and receives communications to and from the wireless device 102 over the network, such as the Internet 106, and on through the wireless service provider. The wireless ASP server computer 104 also communicates over the network, such as the Internet 106, with other network connected devices, such as the server computer 108, via particular protocols in communications channels enabled for such communications on the network. In certain embodiments, for example, the wireless ASP server computer 104 and the wireless device 102 communicate with specialized protocols, such as optimized packetized data protocols, for example, optimized TCP/IP protocols or other protocols such as described in the related patent applications.

Communications between the wireless ASP server computer 104 and the wireless device 102 over the network, including through the wireless service provider and the wireless portion, are performed according to special optimized, non-standard protocols and formats. Communications between the wireless ASP server computer 104 and other portions and elements of the Internet, for example, with the server computer 108, are performed according to different protocols and formats, such as standard networking formats like TCP/IP. For purposes of example here, the network protocol is that of the Internet 106 (i.e., TCP/IP) and certain embodiments of non-standard protocols and formats, for the wireless communications between the wireless ASP server computer 104 and the wireless device 102, are described in the related patent applications. The optimized protocols and formats are not limited to those of the related applications, however, and the same principles and concepts described herein apply to other situations and designs, as well.

Figure 2:
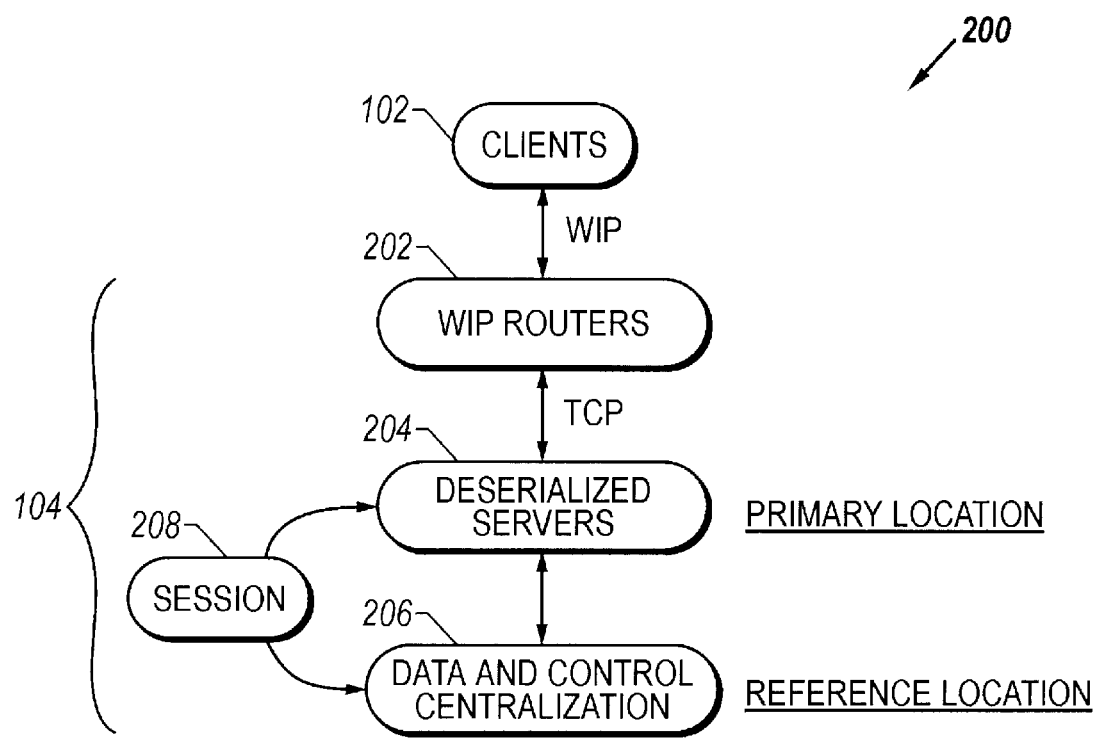
FIG. 2 illustrates an architecture of the ASP server that allows for scalability of the client-server network of FIG. 1, according to embodiments of the present invention.

Referring to FIG. 2, as can be expected, in a system 100 of FIG. 1 pluralities of wireless client devices 102 will be concurrently communicating with the wireless ASP server computer 104. In order to enable such concurrent communications, therefore, the wireless ASP server computer 104 must be substantially scalable. As previously mentioned, the wireless ASP server computer 104 is illustrated as a single element for purposes of this description. It is to be understood, however, that the wireless ASP server computer 104 will, in fact, be highly scalable from a single to computer to pluralities of computers sufficient for concurrent communications of pluralities of wireless client devices 102.

The wireless ASP computer 104, whether comprising one or more physical computing devices, has a tiered architecture 200 of FIG. 2. In this tiered architecture 200, a router 202 interfaces directly with the client device 102. The router 202, as is conventional, directs communications received by the router 202 from the client device 102 to appropriate server elements. Two tiers of server elements, comprising a deserialized server 204 and a centralization server 206, perform distinct server functions in the architecture 200. In the architecture 200, the client device 102 communicates wirelessly with the router 202 by particular protocols, such as optimized wireless protocols as described in the related applications. The router 202 communicates with the deserialized server 204 and the centralization server 206 by conventional standard protocols, such as TCP.

The distinct server function performed by the deserialized server 204 is related to relatively dynamic data that must pass between the client device 102 and the server 104. The centralization server 206, on the other hand, serves primarily the functions related to relatively static data. In other words, the "primary location" function of the deserialized server 204 regards real-time instantaneous events and status, whereas the "reference location" function of the centralization server 206 regards continuing events and status that do not often or readily change in most instances during communications with the client device 102. By employing this two-tiered server architecture 200, higher tiered architectures are not utilized in the typical communications scenarios, and greater and higher scalability is possible.

An additional session server 208 is also part of the server architecture 200. The session server 208 has specific function of establishing logical sessions, by providing data that is common and shared among the other tiers of the architecture 200. Certain of the data that is so shared is herein referred to as "proxy cookies". As hereinafter described in more detail, each of these proxy cookies correspond to a particular one of the client devices 102. The relevant proxy cookie provides information regarding everything about the particular client device 102 to which the cookie relates. The information represented by the proxy cookie includes, for example, prior session manager information and all present status, condition, and reference information for the relevant wireless client device 102. On ending a communications session with a particular client device 102, all session information of the proxy cookie for the session is saved by the server, for example, by a fourth tier (not shown in detail). Such a saved proxy cookie in a fourth tier provides default fall-back cookie information in the event of a failure during a session. In any event, the proxy cookie concept serves to maintain via the session server 208 complete information regarding each client device 102 then communicating by virtue of the respective proxy cookie for the client device 102. Because each proxy cookie is common data to the deserialization server 204 and the centralization server 206, and a fourth tier (not shown) of the server maintains default information from prior communications session, all server functions can be segregated by relatively dynamic versus relatively static data, according to the server segmentation previously mentioned.

Figure 3:
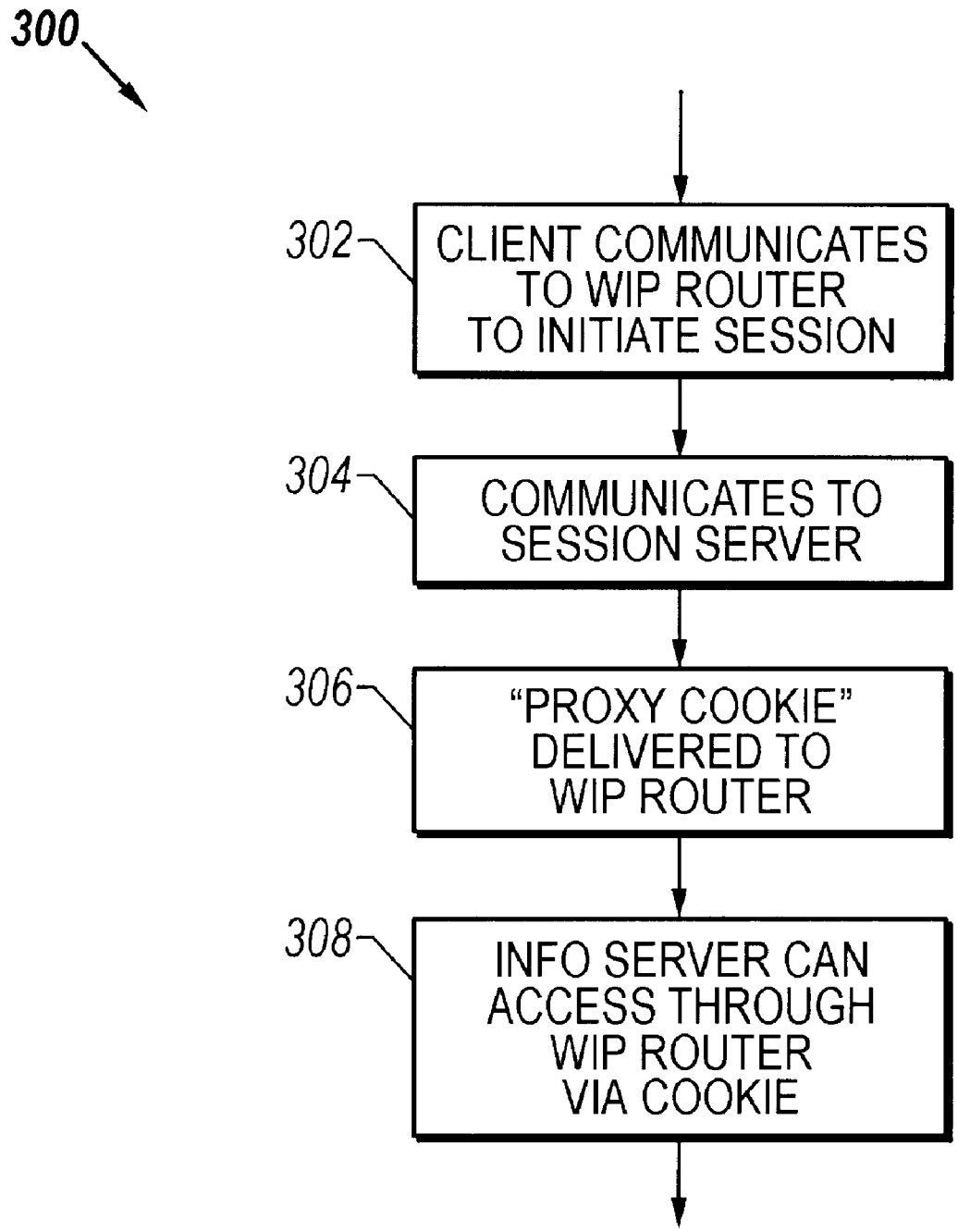
FIG. 3 illustrates a method of operation of the ASP server having the architecture of FIG. 2, according to embodiments of the present invention.

Referring to FIG. 3, a method 300 is performed in operation of the wireless ASP server 104. In the method, the client device 102 communicates in a step 302 to the router 202 to initiate a communications session. In a step 304, the router 202 communicates the initiation to the session server 208. The session server 208 then generates and delivers in a step 306 a proxy cookie specific to the client device 102 and the session to the router 202. The router 202 can then direct in a step 308 any network elements, such as servers 108 (shown in FIG. 1), how and through what location to access the particular client device 102 and interact with the wireless ASP server 104, all via the proxy cookie.

Figure 4:
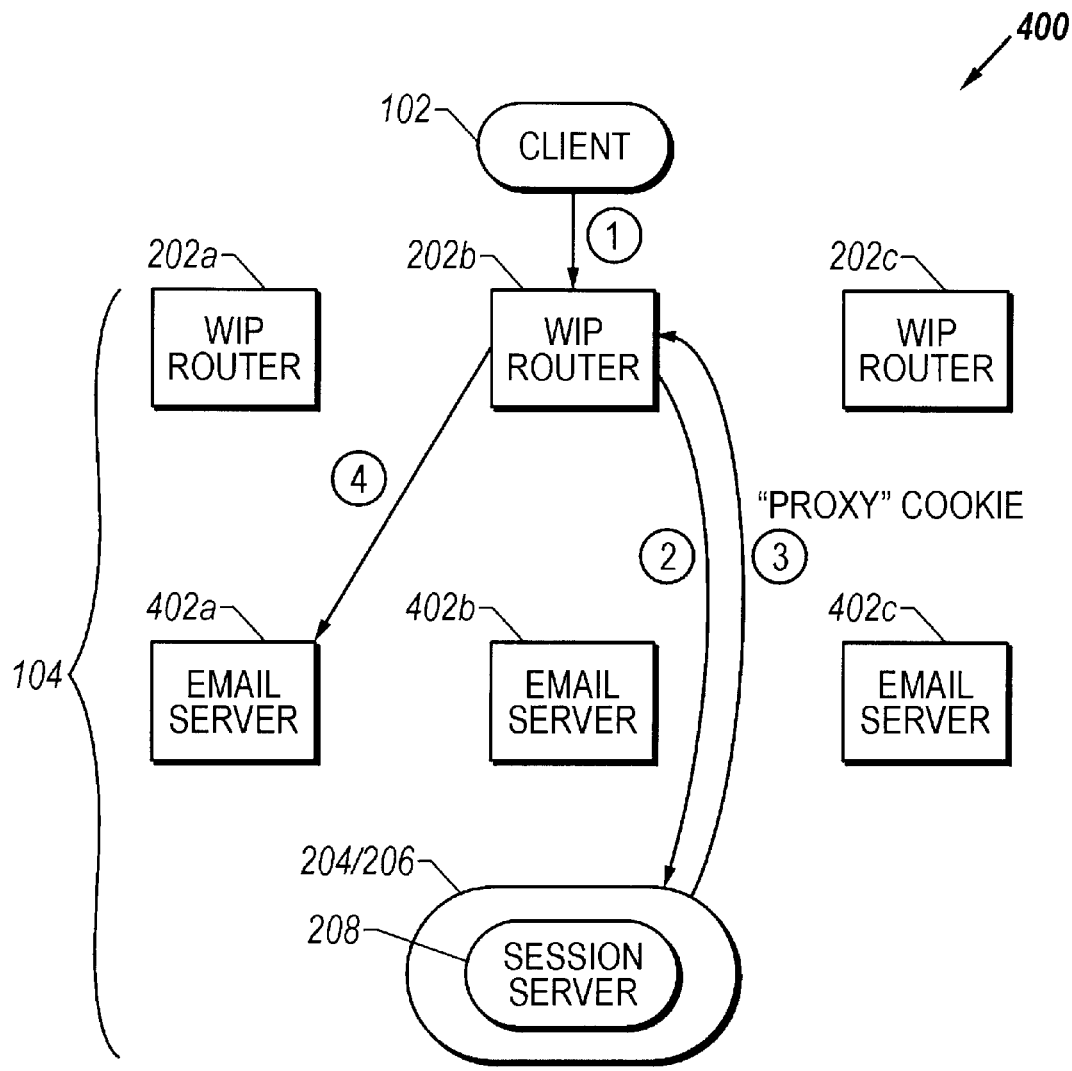
FIG. 4 illustrates an operational diagram of an ASP server having the architecture of FIG. 2 and operating by the method of FIG. 3, according to embodiments of the present invention.

Referring to FIG. 4, exemplary elements of a wireless client-server communications system 400, in accordance with the server architecture 200 and the system 100, includes at least one client device 102. The server 104 in the system 400 includes a plurality of elements, for example, three routers 202a, 202b, 202c, three e-mail servers 402a, 402b, 402c, and the session server 204 as previously described with respect to the architecture 200. The particular elements are intended merely as exemplary, and elements can be increased or decreased to provide scalability and also to provide different or added functions (e.g., ftp server, web server or other server function). The e-mail server function of the illustration is only an example.

In the system 400, the client device 102 initiates a communication session, for example, according to specialized wireless protocols, by connecting one of the routers, such as the router 202b for example purposes. Once the client device 102 so initiates communications, the tiered server 204, 206, together with the session server 208, operate to cause the session server 208 to generate a proxy cookie for the particular session. As previously described, the proxy cookie provides all relevant information regarding the client device 102 for the session and is commonly shared by the tiered server 204, 206 in operation.

The proxy cookie is also delivered to and shared with the router 202b involved in the initiated communication. The proxy cookie dictates for the router 202b the reference locations of the particular e-mail server 402a for purposes of client-server interactions in the communication session. Of course, depending on the particularities of the proxy cookie for the session, the e-mail server so located could have been any other of the e-mail servers 402b, 402c. In effect, the relatively dynamic nature of e-mail data in the system 400 is handled by the system 400 by the proxy cookie that directs the router 202b to provide for communications of the client device 102 with the e-mail server 402a. As can be understood, by using the particular server architecture 200 and the generation and sharing of proxy cookies, scalability of the system 400 is virtually unlimited. Of course, various considerations and limitations will affect the scalability, particularly, the discrimination of appropriate types of relatively dynamic data versus relatively static data. Nonetheless, given suitable discrimination in any application, the system 400 is highly scalable because of the particular architecture 200.

In operation of the foregoing systems and methods, alternative business and technical arrangements are possible. For example, the network could be an intranet, or even an intranet combination or intranet-extranet combination. Numerous banks of the wireless ASP server computer can be possible for receiving communications from pluralities of wireless devices, and the wireless ASP server computers can be centrally located or distributed through a wide geographic area. In the case of a global network such as the Internet, the network is capable of generally communicating by its protocols, which may include other specialized protocols for specific situations, notwithstanding that specialized protocols can be employed for client-server communications in particular in the wireless channels.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wireless communications network, comprising:

a client device;

a router;

a deserialized server;

a centralization server; and a session server that generates a proxy cookie;

wherein the client device wirelessly communicates with the router according to specialized protocols, the router, deserialized server, the centralization server, and the session server communicate according to standard protocols, and the proxy cookie is commonly shared to control routing for purposes of segregating relatively dynamic information and relatively static information.

2. A method of wireless client-server communications, wherein a client device communicates wirelessly with a wireless application service provider (ASP) server computer via specialized protocols, comprising the steps of:

communicating by the client device to a router of the ASP server computer;

communicating by the router to a session server of the ASP server computer;

generating a proxy cookie by the session server;

delivering the proxy cookie to the router; and directing access by the client to the ASP server computer by the proxy cookie.

* * * * *